United States Patent
Chang et al.

(10) Patent No.: US 7,586,814 B2
(45) Date of Patent: Sep. 8, 2009

(54) RECORDING MEDIA DATA STRUCTURE AND METHOD OF READING DATA RECORDED IN RECORDING MEDIA

(75) Inventors: Sheng-Li Chang, Hsinchu Hsien (TW); Tzuan-Ren Jeng, Hsinchu (TW); Chin-Sen Chen, Hsinchu (TW); Feng-Hsiang Lo, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 566 days.

(21) Appl. No.: 11/505,470

(22) Filed: Aug. 17, 2006

(65) Prior Publication Data

US 2007/0109920 A1    May 17, 2007

(30) Foreign Application Priority Data

Nov. 17, 2005    (TW) .............................. 94140392 A (51) Int. Cl.
  *G11B 21/08*    (2006.01)
(52) U.S. Cl. ....................... 369/30.1; 369/94
(58) Field of Classification Search ....... None
  See application file for complete search history.

(56) References Cited

U.S. PATENT DOCUMENTS 5,881,032 A    3/1999    Ito et al.

2003/0137909 A1    7/2003    Ito et al.
2005/0174902 A1*    8/2005    Fujita ...................... 369/47.15

FOREIGN PATENT DOCUMENTS

| JP | 2005-93031 A | 4/2005 |
| JP | 2005-158143 A | 6/2005 |
| JP | 2006-40531 A | 2/2006 |

OTHER PUBLICATIONS

MT. Fuji Commands for Multimedia Devices, Version 6 SFF8090i v6, SFF Committee, Jun. 24, 2005, Revision 0.91.

* cited by examiner

*Primary Examiner*—Paul Huber
(74) *Attorney, Agent, or Firm*—Birch, Stewart, Kolasch & Birch, LLP (57) ABSTRACT

A recording media data structure includes a first recording layer having a lead-in area, a first user region successive to a physical sector of the lead-in area and for storing user data, and a first jump region successive to a physical sector of the first user region; a second recording layer stacked on the first recording layer, the second recording layer having a second jump region, a second user region successive to a physical sector of the second jump region and for storing user data, and a guide-out region successive to a physical sector of the second user region; wherein the lead-in area, the first jump region, the second jump region and the guide-out region each have a constant number of physical sectors, and the second jump region has a beginning physical sector successive to an ending physical sector of the first jump region.

16 Claims, 8 Drawing Sheets

RECORDING MEDIA DATA STRUCTURE AND METHOD OF READING DATA RECORDED IN RECORDING MEDIA

BACKGROUND OF THE INVENTION

1. Field of the Invention

The present invention relates generally to recording media data structures and methods of reading data recorded in recording media, and more particularly, to a recording media data structure and a method of read data recorded in the recording media, which are applicable to a multi-layered structure.

2. Description of Related Art

Modern optical disks used as recording media are required to have a huge data recording capacity. For example, a dual-layered DVD constitutes such an optical disk. The dual-layered DVD comprises two information-recording layers, and has a recording capacity of 8.5 GB, which is larger than the 4.7 GB capacity of a single-layered DVD.

Figure 1A:
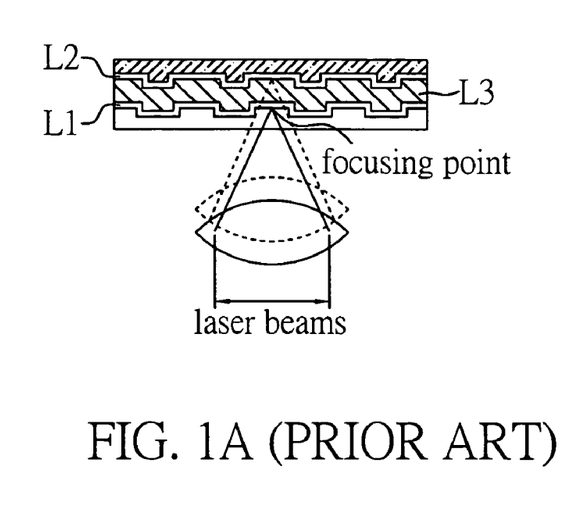
FIG. 1A (PRIOR ART) is a representative diagram illustrating how an optical disk having two recording layers optically tracks and organizes information.

FIG. 1A illustrates a principle to read data recorded in an optical disk having two recording layers. As shown in FIG. 1A, a plurality of pits and lands in different lengths are formed at predetermined locations of a transparent substrate. Both the pits and lands are covered by a half-reflection layer and a total-reflection layer to form a first recording layer L1 and a second recording layer L2, between which a space layer L3 such as transparent photosetting resin (TR) is installed to prevent signals in the first recording layer L1 from interfering signals in the second recording layer L2 and vice versa. By adjusting the thickness of the total-reflection layer, the first recording layer L1 reflects part of light striking it and passes part of the light, while the second recording layer L2 reflects all of the light striking it. When such an optical disk is inserted into a optical disk drive, the disk drive can read data recorded in the optical disk by adjusting the distance between an objective lens and the optical disk recording layers (the first recording layer L1 and the second recording layer L2) by an optical pickup to vary the focusing point of laser beams between the first recording layer L1 and the second recording layer L2.

It should be noted that if the recording media comprises two or more recording layers, two factors should be taken into consideration when allocating physical sector addresses. The first factor is that each of the physical sector addresses of the two or more recording layers must be unique (unlike for the tracking method for parallel track pass). If the first recording layer has a physical sector address identical to that of the second recording layer, the disk driver is unable to determine which of the recording layers should be selected to read or write information using identical physical sector addresses. The second factor is that a physical sector address allocated to each of the recording layers can be converted to any of the addresses of the other recording layers easily because the physical sector address corresponds to location information. In order to ensure that the optical pickup of the disk drive can be moved to a required sector quickly and accurately, physical sector addresses are used to calculate the distance the optical pickup needs to move.

Figure 1B:
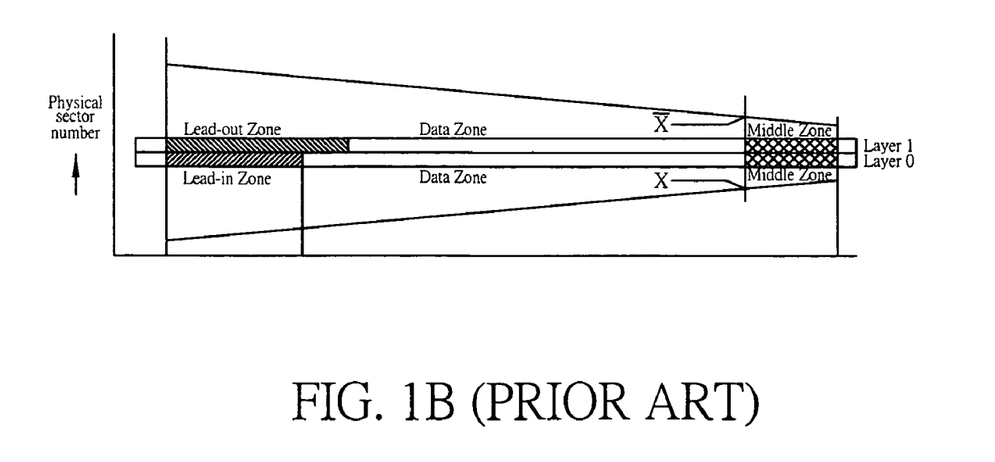
FIG. 1B (PRIOR ART) is a representative cross-sectional diagram of a location encoding method of the OTP tracking method adopted by a conventional dual-layered optical disk.

In general, a modern dual-layered disk adopts the tracking method of opposite track path (OTP). As shown in FIG. 1B, the method utilizes the optical pickup to read the optical disk from a lead-in zone of recording layer 0 when reading the optical disk sequentially. The optical pickup then moves along a data zone to a middle zone located in an outer ring, and then the optical pickup focuses on the next recording layer 1. Then, the optical pickup moves in the opposite direction to read the data recorded in the middle zone of layer 1 until it moves to a lead-out zone located in an inner ring, which brings the optical pickup back to where it started but focused on the lead-out zone of layer 1 instead of the lead-in zone of layer 0 where it first started reading. In that the optical pickup does not have to move back to the most inner rings each time it reads all the data recorded in a recording layer, and can read data recorded in another recording layer directly, time for the optical pickup to seek data recorded in the next recording layer is short, making the method popular.

Figure 2A:
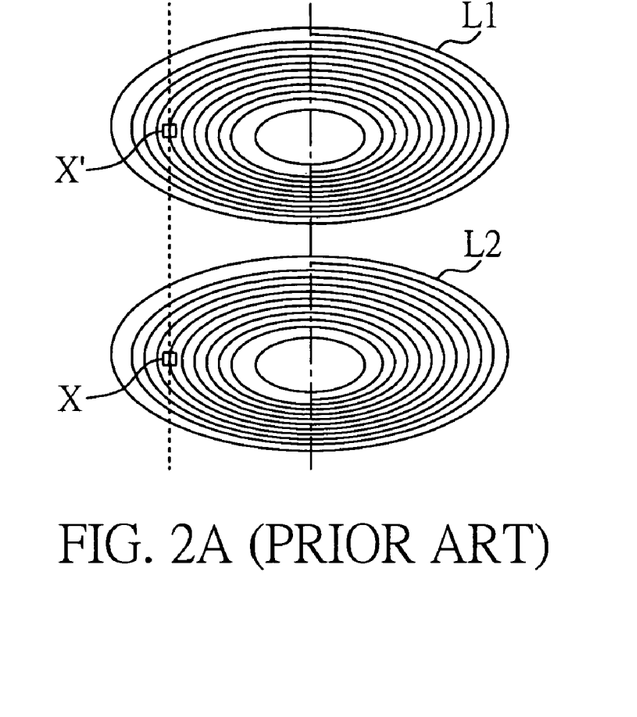
FIG. 2A (PRIOR ART) is a representative diagram of the spiral grooves of an optical disk having two recording layers according to the prior art.

U.S. Pat. No. 5,881,032 "Optical Disk, And Optical Disk Reproduction Method And Apparatus Implementing a Mathematical Complementary Relationship For Plural Layers" discloses a location encoding rule for recording media. In the method, as illustrated in FIG. 2A, the recording medium comprises a plurality of recording layers, wherein the spiral grooves of the odd-numbered layers have reproduction directions opposite to those of the spiral grooves of the even-numbered layers, and the physical sector addresses allocated to the odd-numbered layers and the even-numbered layers, both of which having identical radius, are complementary to one another.

Figure 2B:
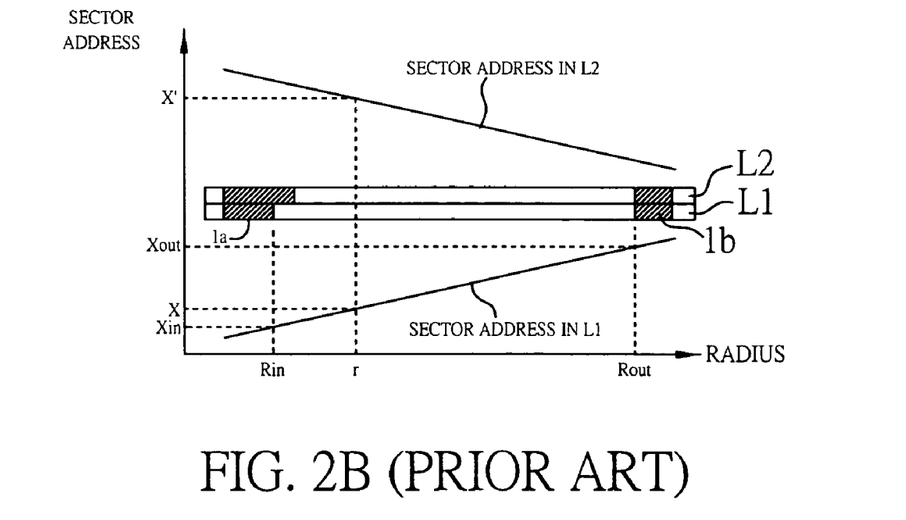
FIG. 2B (PRIOR ART) is a representative cross-sectional diagram of address allocation of a recording media having two recording layers according to the prior art.

FIG. 2B is a schematic diagram of address allocation for the recording medium having at least two recording layers of the above-mentioned patent. The first layer L1 at radius r has a physical sector address X mathematically complementary to the physical sector address X' of the second layer L2 also at radius r. For example, if a first sector in layer L1 at radius r has a physical sector address equal to 030000h, then the complementary sector of the second layer L2 at radius r has a physical sector address equal to FCFFFFh, which is the mathematical (binary) complement of the former address. As shown in FIG. 2B, a shaded region 1a indicates a lead-in area, while another shadow region 1b indicates a middle area. The blank region between the lead-in area 1a and the middle region 1b indicates a user information region. The first user sector available for data on the first layer has a physical sector address equal to Xin at the inner radius, while the last user sector available for data on the first layer has a physical sector address equal to Xout at the outer radius, Xout being larger than Xin. The physical sector addresses of the first layer L1 successively increase from the inner ring to the outer ring. A value complementary to the physical sector address of the first layer L1 at radius (R) is used as the corresponding physical sector address of the second layer L2. Therefore, the physical sector addresses of the second layer L2 also successively increase. Further, the beginning physical sector address of the second layer L2 is not located right after the ending physical sector address of the first layer L1.

Figure 2C:
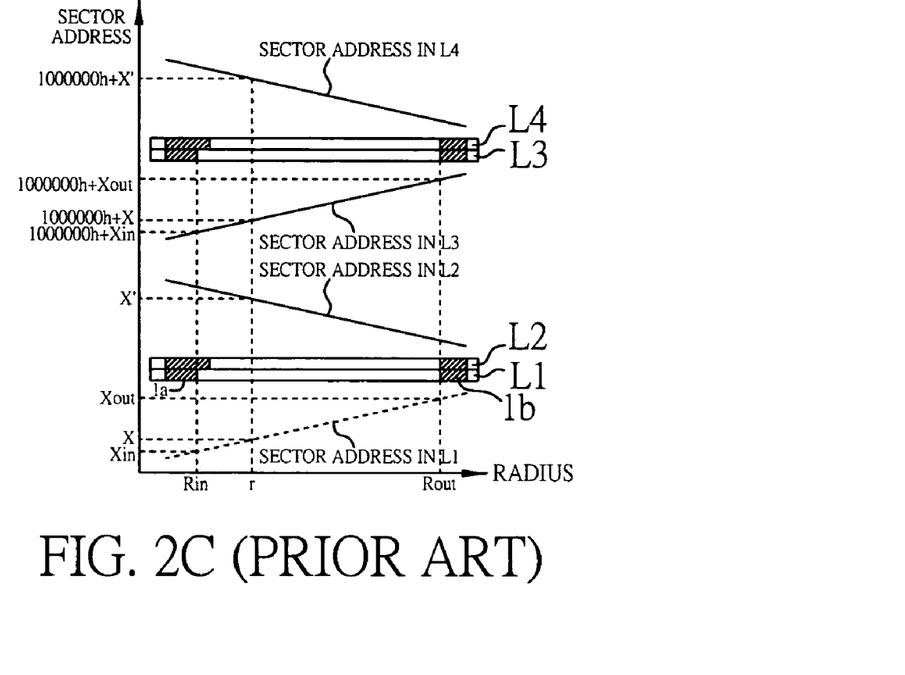
FIG. 2C (PRIOR ART) is a graph of address allocation of a recording media having four recording layers according to the prior art.

FIG. 2C is a schematic diagram of the location allocation of a recording medium having four recording layers. As shown in FIG. 2C, in order to differentiate the physical sector addresses of the third layer L3 and the fourth layer L4 from the physical sector addresses of the first layer L1 and the second layer L2, one byte has to be prefixed to each of the physical sector addresses. According to this scheme, only the last three bytes of the physical sector addresses adopt the complementary principle. For example, if is assumed that the third layer L3 has the physical sector address equal to 01030000h, then the fourth layer LA at the identical radius has the physical sector address equal to 01FCFFFFh.

However, in that the address encoding rule disclosed by the above-mentioned patent posits that only the first recording layer and second recording layer have physical sector addresses that are completely complementary, the address encoding method is generally applied only to the medium of a dual-layered DVD. Thus, the encoding rule has poor expandability and is not suitable for more generalized usage.

Figure 2D:
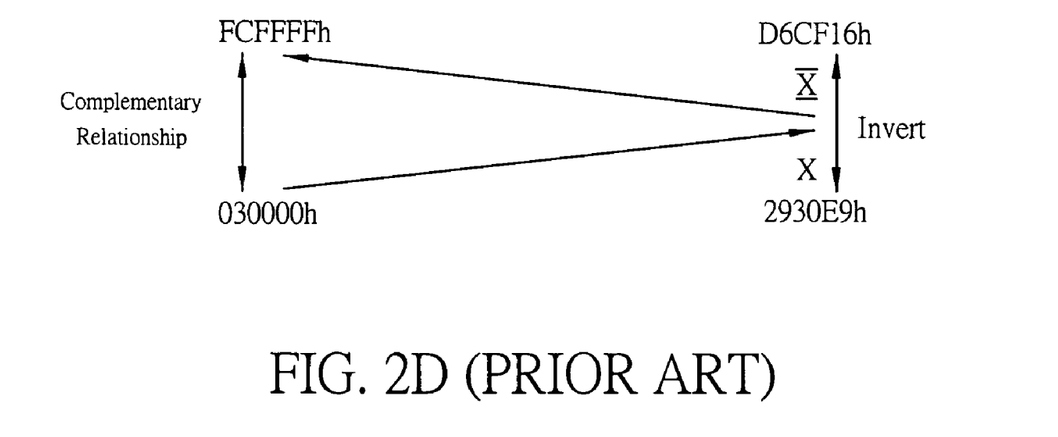
FIG. 2D (PRIOR ART) is a graph of the plurality of layers of physical sector addresses complementary to one another according to the prior art.

If the address encoding method is applied to an optical DVD having three or more recording layers, the optical DVD has to have one extra byte reserved for recording data and therefore has less data storage capacity. Each of the recording layers loses about 2.4 M bytes of data recording capacity. Moreover, for a DVD with a radius of six centimeters, the data recording region is located between 24 mm-58 mm. If such an address encoding rule performs the address encoding process, for an address width of three bytes, only two small allocation addresses ranges exist to record data spanning from 030000h to 2930E9h and from D6CF16h to FCFFFFh. Therefore, a huge allocation address range spanning between 2930E9h and D6CF16h is idle and most of the address range of the optical DVD is wasted (as shown in FIG. 2D). Moreover, in a document system, the access position where audio/video data is stored in a common optical disk is allocated according to logical sector locations or addresses that map to physical sector addresses, so a conversion action between logical sector addresses and a physical sector addresses has to be performed while the optical driver is accessing data recorded in the optical disk. According to a common rule adopted by a majority of disk manufactures, the data recording region of a common DVD has a beginning physical sector address equal to 030000h, and has a beginning logical sector address equal to 000000h, so when the disk drive needs to read the data recorded at a particular physical sector address, the corresponding logical sector address must be converted according to a conversion equation. The above-mentioned patent discloses the conversion equation as follows:

$$LSA = PSA - X\text{in, when PSA is located in the first layer; and}$$

$$LSA = PSA + [2*X\text{out}+2] - X\text{in, when PSA is located in the second layer,}$$

where LSA and PSA denote a logical and a physical sector address, respectively.

However, the conversion equation between LSA and PSA can only be applied to a dual-layered DVD adopting a complementary address scheme. Therefore, the conversion equation is not applicable in a DVD having three or more layers because the prefixed additional byte is not suitable for the complementary manner.

Accordingly, it is quite desirable to create a data allocation structure applicable to multi-layered recording media of more than two layers that allocates addresses effectively in the optical-storage industry.

SUMMARY OF THE INVENTION

Accordingly, it is a primary objective of the present invention to solve the problems of the aforementioned conventional technology by providing a recording media data structure and a method of reading data recorded in recording media applicable to multi-layered recording media.

It is another objective of the present invention to provide a recording media data structure and a method of reading data recorded in recording media to fully utilize the allocation address numbers, so as to increase data storage capacity.

It is yet another objective of the present invention to provide a recording media data structure and a method of reading data recorded in recording media that provides a simple conversion method between physical sector addresses and logical sector addresses applicable for multi-layered recording media. It is yet another objective of the present invention to provide a recording media data structure and a method of reading data recorded in recording media that improves the data reading efficiency of the recording media, thus reducing the reading time.

In order to attain the objectives mentioned above and others, the present invention presents recording media data structure and a method of reading data recorded in recording media. The recording media data structure includes a first recording layer having a lead-in area, a first user region successive to a physical sector address of the lead-in area and for storing user data, and a first jump region successive to a physical sector address of the first user region; and a second recording layer stacked on the first recording layer, the second recording layer having a second jump region, a second user region successive to a physical sector address of the second jump region and for storing user data, and a guide-out region successive to a physical sector address of the second user region; wherein the lead-in area, the first jump region, the second jump region, and the guide-out region have a constant number of physical sectors, and the first jump region has an ending physical sector in sequence with a beginning physical sector of the second jump region.

Another embodiment of the recording media data structure of the present invention also includes a first recording layer having a lead-in area, a first user region successive to a physical sector address of the lead-in area and for storing user data, and a first jump region successive to a physical sector address of the first user region; an intermediate recording layer stacked on the first recording layer, the intermediate recording layer having an outside jump region, a user region successive to a physical sector address of the outside jump region and for storing user data, and an inside jump region successive to a physical sector address of the user region; and a second recording region stacked on the intermediate recording layer, the second recording layer having a second jump region, a second user region successive to a physical sector address of the second jump region and for storing user data, and a guide-out region successive to a physical sector address of the second user region; wherein the lead-in area, the first jump region, the outside jump region, the inside jump region, the second jump region, and the guide-out region of the first recording layer; the intermediate recording layer; and the second recording layer have a constant number of physical sectors, the first jump region has an ending physical sector address in sequence with a beginning physical sector address of the outside jump region, and the inside jump region has an ending physical sector address in sequence with a beginning physical sector address of the second jump region.

The recording media data reading method is applicable to a recording media having a first recording layer and a second recording layer stacked on the first recording layer, the first recording layer having a lead-in area, a first user region successive to a physical sector address of the lead-in area and for storing user data, and a first jump region successive to a physical sector address of the first user region; the second recording layer having a second jump region, a second user region successive to a physical sector address of the second jump region and for storing user data, and a guide-out region successive to a physical sector address of the second jump region. The method includes (1) recording in the lead-in area a beginning physical sector address (SGIPSA) of the lead-in area, a beginning physical sector address (SURPSA) of the first user region, ending physical sector addresses of the first user region (EPSAL) and the second user region (ESPSA2), and three numbers of physical sectors of the first jump region, the second jump region, and the guide-out region; (2) reading the ending physical sector address of the first user region of the lead-in area, and the number of physical sectors of the first jump region and the second jump region; (3) reading a current physical sector address and determining if the read current physical sector address is located in the ending physical sector address, and, if it is, proceeding to step (4), or, if it is not, then repeating step (3); and (4) jumping to the second recording layer, and interpreting the current physical sector address, and utilizing a predetermined conversion method to calculate and find the beginning physical address of the second user region of the second recording layer according to the ending physical sector address of the first user region, so as to read the user data successively.

Compared with the prior art, the recording media data structure and the method of reading data recorded in recording media are applicable to recording media having at least two recording layers, and make full use of the allocation address numbers. The present invention also presents a simple conversion method between physical sector addresses and logical sector addresses. The present invention can further analyze storage location of media data ready to be read according to corresponding address information recorded in the lead-in area, so as to improve the media data reading efficiency and reduce the reading time.

BRIEF DESCRIPTION OF DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

The following description contains specific information pertaining to the implementation of the present invention. One skilled in the art will readily recognize other advantages and features of the present invention after reviewing the disclosure of the present application. It is manifest that the present invention can be implemented and applied in a manner different from that specifically discussed in the present application. It should also be understood that the invention is not limited to the particular exemplary embodiments described herein, but is capable of many rearrangements, modifications, and substitutions without departing from the spirit of the present invention.

The recording media data structure of the present invention comprises at least two recording layers. In the common multi-layered disk manufacturing process, a plurality of films capable of being encoded with data are stacked or adhered on a substrate. During the manufacturing process, a variety of factors such as tolerance induced by clamping devices cause both edges of each of the recording layers of the multi-layered disk to be uneven. That is, a "location error" appears. Such a "location error" can cause the optical pickup of the disk drive to jump to read data recorded in another layer, resulting in not only invalid reading but also possibly resulting in mechanical breakdown because the optical pickup can be moved to a non-data region where it cannot lock on to track correctly. In order to prevent the above abnormal situation from happening, the prior art utilizes two protective regions on both the front end and the rear end of user regions of each of the recording layers of a multi-layered disk, storing information related to physical sector addresses and region names in such a way as to accommodate the regions. Therefore, after jumping from one layer to another layer, the optical pickup can read corresponding physical sector addresses immediately according to the addresses which it can lock on to perform tracking. One of the characteristics of the present invention is that all of the protection regions comprise a constant number of physical sectors (which will be described in the following paragraphs).

According to the embodiment, the protection region is divided in accordance with a variety of functionalities into a lead-in area, an inside jump region, an outside jump region, or a guide-out region, in order to provide a variety of capabilities. The lead-in area is provided in a beginning address region of a first recording layer of a multi-layered disk. In general, the lead-in area is located in the inner ring of a multi-layered disk for recording corresponding information reserved for the interpretation of the optical driver. The guide-out region is installed in an ending region of a last recording layer of the multi-layered disk. If the multi-layered disk has an even number of recording layers, the lead-in area is located in the inner ring of the multi-layered disk. If the multi-layered disk has an odd number of recording layers, the lead-in area is located in an outer ring of the multi-layered disk. The inside jump region is installed in inner rings in all of the recording layers except the first recording layer (if the outer ring of the last recording layer comprises the guide-out region, the outer ring does not have any outside jump region).

Figure 3A:
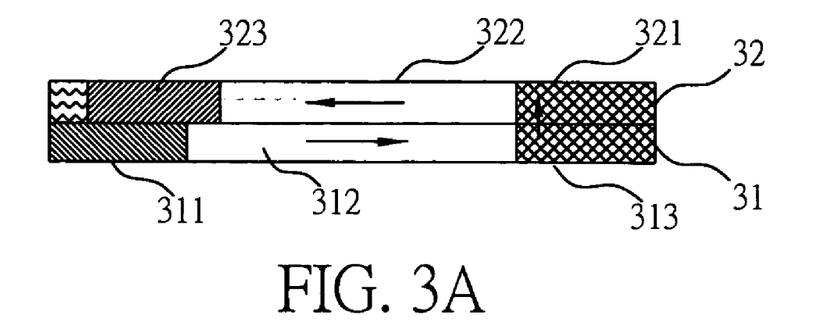
FIG. 3A is a representative cross-sectional diagram of a recording media data structure of a first embodiment according to the present invention.

FIG. 3A is a schematic diagram of the recording media data structure of the first embodiment according to the present invention. Data is read along the directions indicated by the arrows. The recording media comprises a first recording layer 31 and a second recording layer 32 stacked on the first recording layer 31. The first recording layer 31 comprises a lead-in area 311, a first user region 312, and a first jump region 313. The lead-in area 311, the first user region 312, and first jump region 313 have continuous physical sector addresses (PSA). The second recording layer 32 comprises a second jump region 321, a second user region 322, and guide-out region 323. The second jump region 321, the second user region 322, and the guide-out region 323 also have continuous physical sector addresses. The first jump region 313 has an ending physical sector address immediately succeeding or preceding the beginning physical sector address of the second jump region 321. The lead-in area 311, the first jump region 313, the second jump region 321, and the guide-out region 323 have a constant and reasonable number of physical sectors in the implementation of the data structure. However, the lead-in area 311, the first jump region 313, the second jump region 321, and the guide-out region 323 can comprise identical or different numbers of physical sectors relative to each other as long as the numbers don't change. According to the first embodiment and the standard defined by the DVD specification, an error of each of the stacked recording layers is not larger than 0.5 mm, and spans about 676 tracks if track pitch is 0.74 μm, and comprises about 48,000 physical sectors if calculated based on the outer ring of the DVD. Therefore, one of the preferred embodiments of the present invention assumes that both of the first jump region 313 and the second jump region 321 have 50,000 physical sectors. However, such an assumption is only one of the preferred embodiments, and is not used to restrict the implementation of the present invention. Further, the lead-in area 311 is recorded with the beginning physical sector address (SGIPSA) of the lead-in area 311, the beginning physical sector address (SURPSA) of the first user region 312, the ending physical sector address (EPSA1) of the first user region 312, the ending physical sector address (EPSA2) of the second user region 322, and three numbers representing the number of physical sectors of the first jump region 313, the second jump region 321, and the guide-out region 323.

Figure 3B:
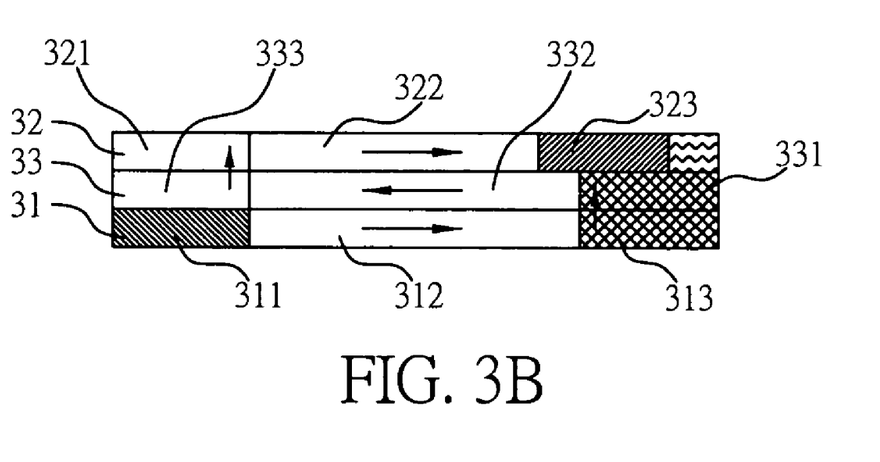
FIG. 3B is a representative cross-sectional diagram of a recording media data structure of a second embodiment according to the present invention.

FIG. 3B is a schematic diagram of a recording media data structure of the second embodiment according to the present invention. Data is read along the directions indicated by the arrows for each layer. The recording media comprises a first recording layer 31, an intermediate recording layer 33 stacked on the first recording layer 31, and a second recording layer 32 stacked on the intermediate recording layer 33. The first recording layer 31 comprises a lead-in area 311, a first user region 312, and a first jump region 313. The lead-in area 311, the first user region 312, and the first jump region 313 have continuous physical sectors. The intermediate recording layer 33 comprises an outside jump region 331, a user region 332 and an inside jump region 333. The outside jump region 331, the user region 332, and the inside jump region 333 also have continuous physical sectors. The second recording layer 32 comprises a second jump region 321, a second user region 322 and a guide-out region 323. The second jump region 321, the second user region 322 and the guide-out region 323 also have continuous physical sectors. The first recording layer 31 has an ending physical sector address (that is the ending physical sector address of the first jump region 313) immediately succeeding or preceding the beginning physical sector address of the intermediate recording layer 33 (that is the beginning physical sector address of the outside jump region 331). The intermediate recording layer 33 has an ending physical sector address (that is the ending physical sector address of the inside jump region 333) immediately succeeding or preceding the beginning physical sector address of the second recording layer 32 (that is the beginning physical sector address of the second jump region 321). The lead-in area 311, the first jump region 313, the outside jump region 331, the inside jump region 333, the second jump region 321, and the guide-out region 323 comprises constant and reasonable numbers of physical sectors in the implementation of the data structure. However, these numbers can be identical or different with respect to each other providing that they don't change. Further, the lead-in area 311 is recorded with the beginning physical sector address of the lead-in area 311, the beginning physical sector address of the first user region 312, the three ending physical sector addresses of the first user region 312, the intermediate user region 332, and the second user region 322, and the five numbers for the number of physical sectors of the first jump region 313, the outside jump region 331, the inside jump region 333, the second jump region 321, and the guide-out region 323.

A method of reading data recorded in recording media is described in the following paragraphs in accordance with FIG. 3A. Please note that the reading method is not limited to the application of a two-layered recording medium data structure, but, more generally, to a multi-layered recording medium data structure (such as the three-layered one shown in FIG. 3B).

According to the embodiment, all data recorded in the recording media-data structure are read by an optical pickup of a disk drive (not shown). The method using the example of the two-layered structure shown in FIG. 3A comprises:

(1) Recording into the lead-in area 311 the beginning physical sector address of the lead-in area 311, the beginning physical sector address of the first user region 312, the ending physical sector addresses of the first user region 312 and the second user region 322, and the three numbers for the number of physical sectors of the first jump region 313, the second jump region 321, and the guide-out region 323;

(2) When the optical driver needs to read data recorded in the recording media, the optical pickup locks on to a region within the lead-in area 311 to read the beginning physical sector address of the lead-in area 311 recorded in the lead-in area 311, the beginning physical sector address of the first user region 312, the ending physical sector addresses of the first user region 312, and the second user region 322, and the number of physical sectors of the first jump region 313, the second jump region 321, and the guide-out region 323.

(3) Comparing the read beginning physical sector address of the first user region 312 with a physical sector address locked by the optical pickup, and determining a moving direction of the optical pickup, so as to enable the optical pickup to move to the beginning physical sector address of the first user region 312 to read the data recorded in the first user region 312 from the beginning physical sector address to the ending physical sector address (Step 3 does not proceed to step 4 until the physical sector address where the optical pickup is tracking is determined to be equal to or larger than the ending physical sector address of the first user region 312 read in the lead-in area); and (4) After the current reading position of the optical pickup is determined to be located at the ending physical sector address of the first user region 312, a jump command is executed to focus the optical pickup on the second recording layer 32 to read the current physical sector address. Then according to the ending physical sector address of the first user region 312, a predetermined conversion method, which will be described in the following paragraphs, is used to calculate the beginning physical sector address of the second user region 322 of the second recording layer 32, and to compare the calculated beginning physical sector address of the second user region 322 of the second recording layer 32 with the interpreted current physical sector address, so as to enable the optical pickup to move to the beginning physical sector address and read the user data continuously. The current physical sector address will be kept to be compared with the ending physical sector address of the second user region 322 until the current physical sector current is equal to or larger than the ending physical sector address of the second user region 322, which represents the end of the data reading process.

The operation process to determine where the optical pickup is located according to the physical sector address and whether the optical pickup needs to jump to another layer, as well as the conversion method between the logical sector addresses and the physical sector addresses will be described in the following paragraphs in accordance with FIG. 3B. In order to simplify the description of the embodiment, the lead-in area 311, the inside jump region 333, and the second jump region 321 of the recording media are assumed to have identical numbers of physical sectors, so the number of the physical sectors (G1)=(the beginning physical sector address SURPSA of the first user region 312)−(the beginning physical sector address SGIPSA of the lead-in area 311). Likewise, the first jump region 313, the outside jump region 331, and the guide-out region 323 are assumed to have identical numbers (G2) of physical sectors, (G2) being equal to or different from (G1).

Figure 4:
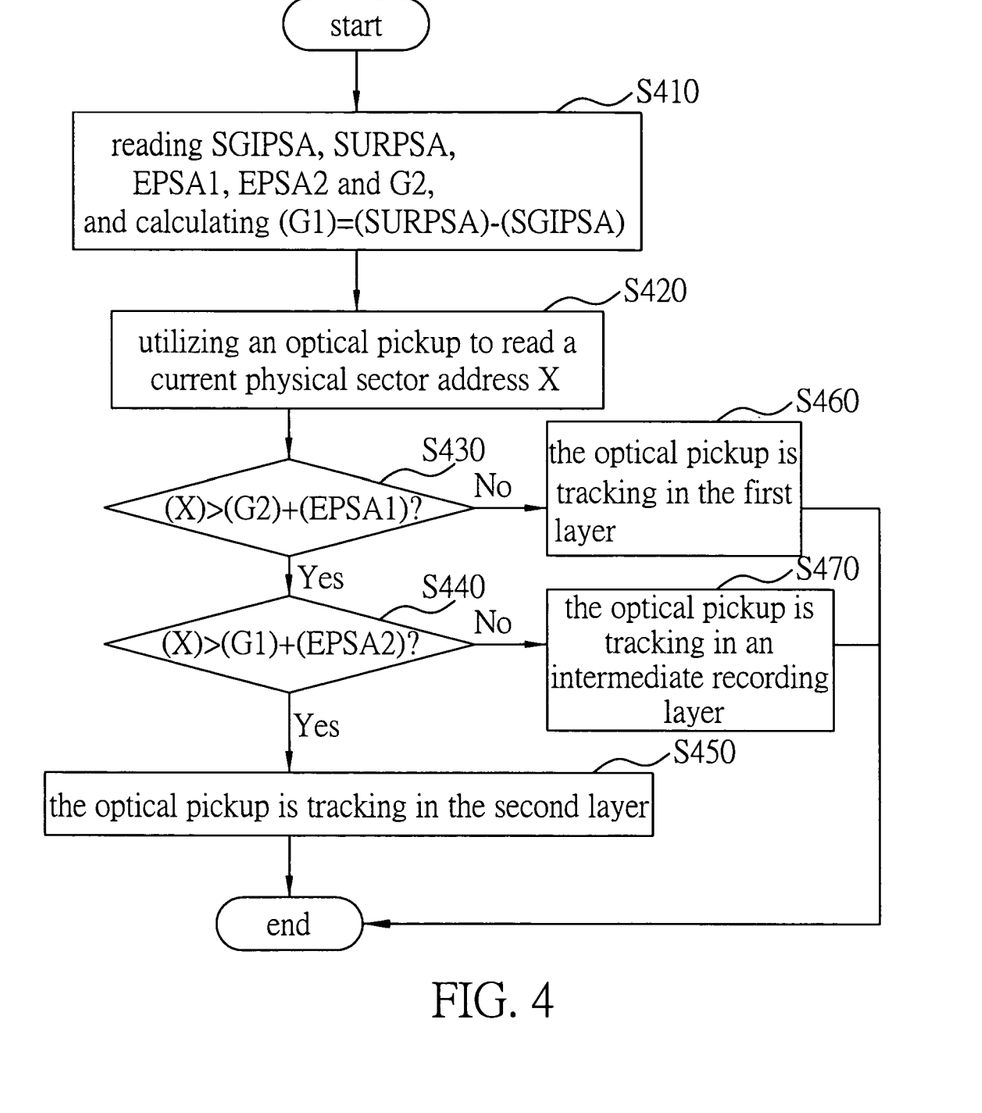
FIG. 4 is a flowchart of the operation process to determine in which layer an optical pickup is tracking or needs to track according to a physical sector address.

FIG. 4 is a flowchart of the operation process to determine where the optical pickup is currently located according to a physical sector address. As shown in FIG. 4, the operation process begins at step S410. In step S410, the following occur: reading the beginning physical sector address (called SGIPSA in brief hereinafter) of the lead-in area 311 in the lead-in area 311, the beginning physical sector address (called SURPSA in brief hereinafter) of the first user region 312, the ending physical sector address (called EPSA1 in brief hereinafter) of the first user region 312, the ending physical sector address (called EPSA2 in brief hereinafter) of the intermediate user region 332, and the number (called G2 in brief hereinafter) of physical sectors of the first jump region 313, and calculating a number (called G1 in brief hereinafter) of physical sectors of the lead-in area 311, wherein (G1)=(SURPSA)−(SGIPSA), and the number of physical sectors of the inside jump region 333 is calculated to be equal to G1. Then, flow proceeds to step S420.

In step S420, the current physical sector address is read, then proceeding to step S430.

In step S430, determine if X is larger than (G2)+(EPSA1), and, if it's not, the optical pickup is determined to be located in the first recording layer 31 (as S460), and if it is, then proceed to step S440.

In step S440, determine if X is larger than (G1)+(EPSA2), and if it's not, the optical pickup is determined to be located in the intermediate recording layer 33 (as S470), and if it is, then proceed to step S450. In step S450, determine if the optical pickup is located in the second recording layer 32.

Figure 5:
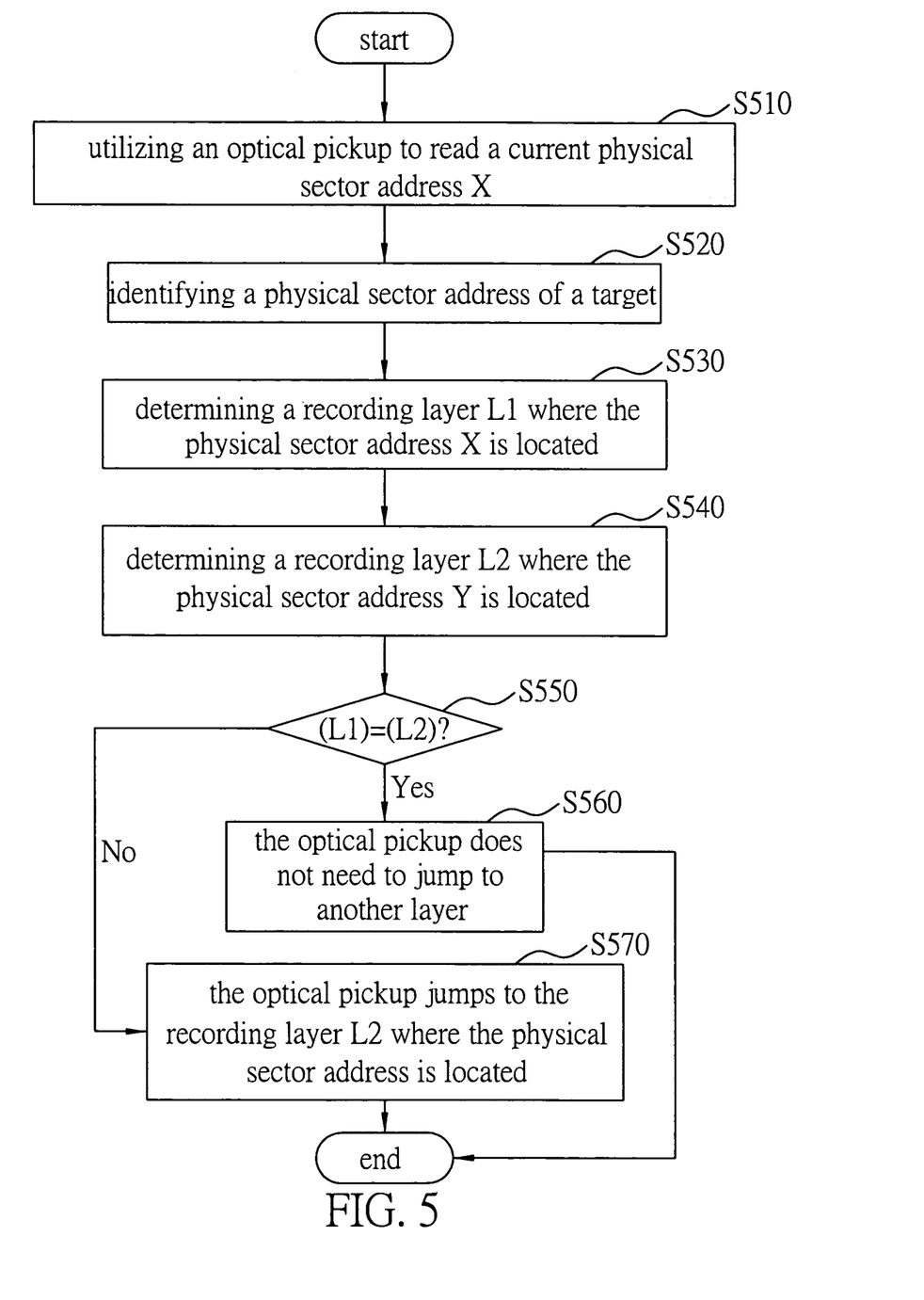
FIG. 5 is a flowchart of the operation process to determine if the optical pickup needs to switch layer by the use of the calculation method shown in FIG. 4.

FIG. 5 is a schematic diagram of the operation process making use of the determination rule shown in FIG. 4 to determine if the optical pickup needs to jump to another layer. In other words, when a user needs to read a certain sector of data, the operation process provides the optical pickup a method to determine whether to jump to another layer or not. The operation process begins in step S510, reading the current physical sector address (called X in brief hereinafter), then proceed to step S520.

In step S520, identify the physical sector address (called Y in brief hereinafter) of a target, wherein Y is the physical sector address of the certain sector of data the user needs to read, then proceed to step S530.

In step S530, determine the recording layer (called L1 in brief hereinafter) where X is located according to the above-described determination rule, then proceed to step S540.

In step S540, determine the recording layer (called L2 in brief hereinafter) where Y is located according to the above-described determination rule (as shown in FIG. 4), then proceed to step S550.

In step S550, determine if L1 is equal to L2, and if equal, proceed to step S560, or, if unequal, proceed to step S570.

In step S560, L1 is equal to L2, indicating the current address and the identified address are in the same layer, indicating that the optical pickup does not to jump to another layer.

In step S570, L1 is not equal to L2, indicating that the optical pickup needs to jump to another layer in order to read data continuously.

Figure 6A:
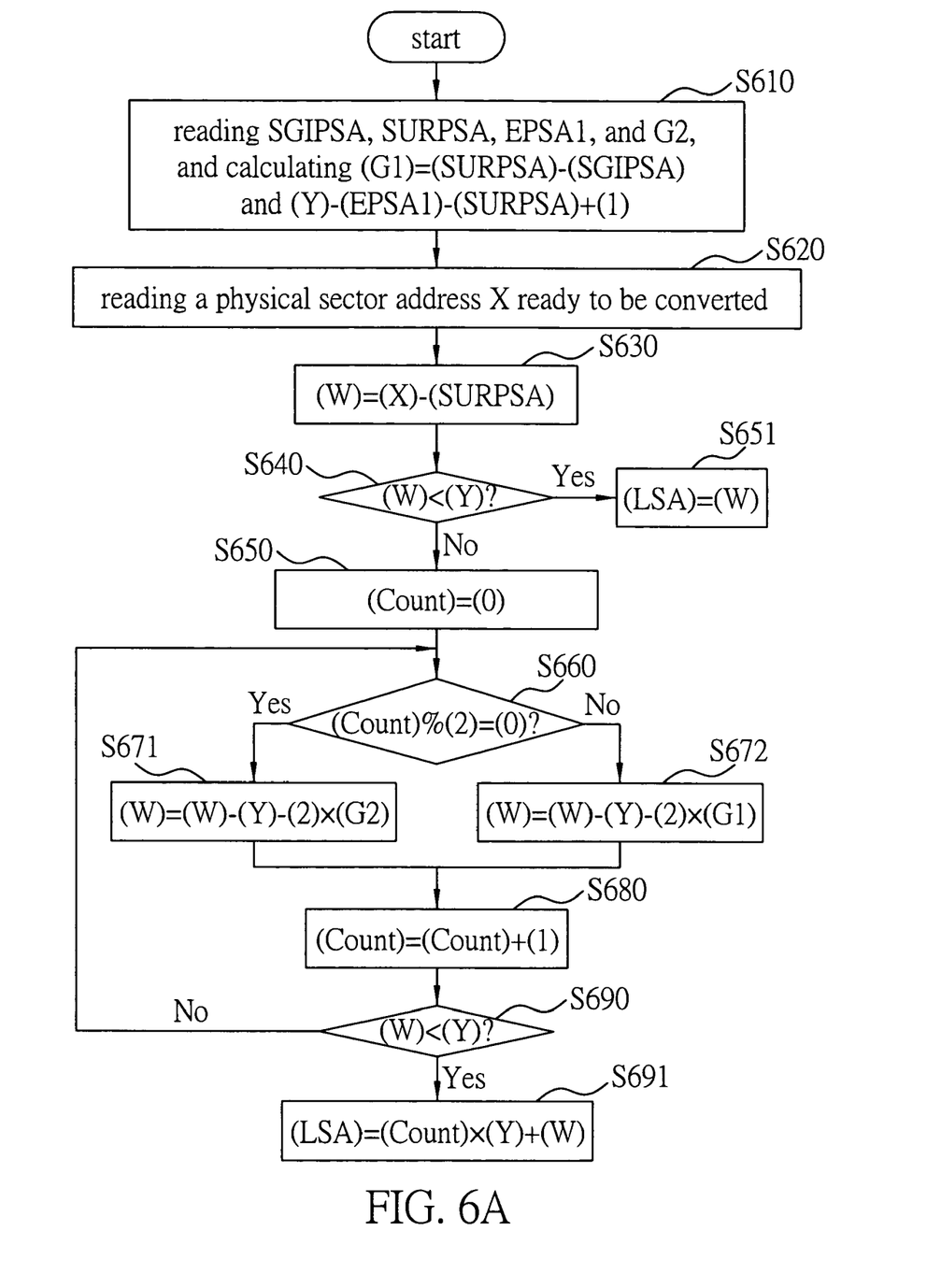
FIG. 6A is a flowchart illustrating how a physical sector address is converted to a logical sector address.

FIG. 6A is a schematic diagram of the process illustrating how a physical sector address is converted into a logical sector address. Making reference to FIG. 3B as well, the lead-in area 311, the inside jump region 333, and the second jump region 321 have identical numbers of physical sectors; the first user region 312 and the intermediate layer user region 332 have identical numbers of physical sectors; and the first jump region 313, the outside jump region 331, and the second jump region 323 have identical numbers of physical sectors. The process begins in step S610, where the following are read: the beginning physical sector address (called SGIPSA in brief hereinafter) of the lead-in area 311 in the lead-in area 311, the beginning physical sector address (called SURPSA in brief hereinafter) of the first user region 312, the ending physical sector address (called EPSAL in brief hereinafter) of the first user region 312, and the two numbers for the number of physical sectors (called G2 in brief hereinafter) of the first jump region 313 and the outside jump region 331; which is followed by the calculation of the three numbers (called G1 in brief hereinafter) of the lead-in area 311, the inside jump region 333, and the second jump region 321, and calculation of a number (called Y in brief hereafter) of the first user region 312 and the intermediate layer user region 332, wherein (G1)=(SURPSA)−(SGIPSA) and (Y)=(EPSA1)−(SURPSA)+(1). The flow proceeds to step S620.

In step S620, a physical sector address (called X in brief hereinafter) that needs to be converted for the recording media is read. Then, flow proceeds to step S630.

In step S630, the difference (called W in brief hereinafter) is calculated between X and SURPSA. Then, flow proceeds to step S640.

In step S640, determine if W is smaller than Y, and, if it is smaller, proceed to step S651 to get the logical sector address (called LSA in brief hereinafter), and, if it is not smaller, then proceed to step S650.

In step S650, a count number (called Count in brief hereinafter) is initialized to zero. Then flow proceeds to step S660.

In step S660, determine if Count is divisible by two, and if it is, proceed to step S671, and if it isn't, then proceed to step S672.

In step S671, calculate the equation (W)=(W)−(Y)−(2)×(G2). Then, flow proceeds to step S680.

In step S672, calculate the equation (W)=(W)−(Y)−(2)×(G1). Then, flow proceeds to step S680.

In step S680, calculate (Count)=(Count)+(1). Then, flow proceeds to step S690.

In step S690, determine if W is smaller than Y, and if it is smaller, proceed to step S660, and if it is not smaller, then proceed to step S691.

In step S691, calculate LSA according to the equation (LSA)=(Count)×(Y)+(W).

Figure 6B:
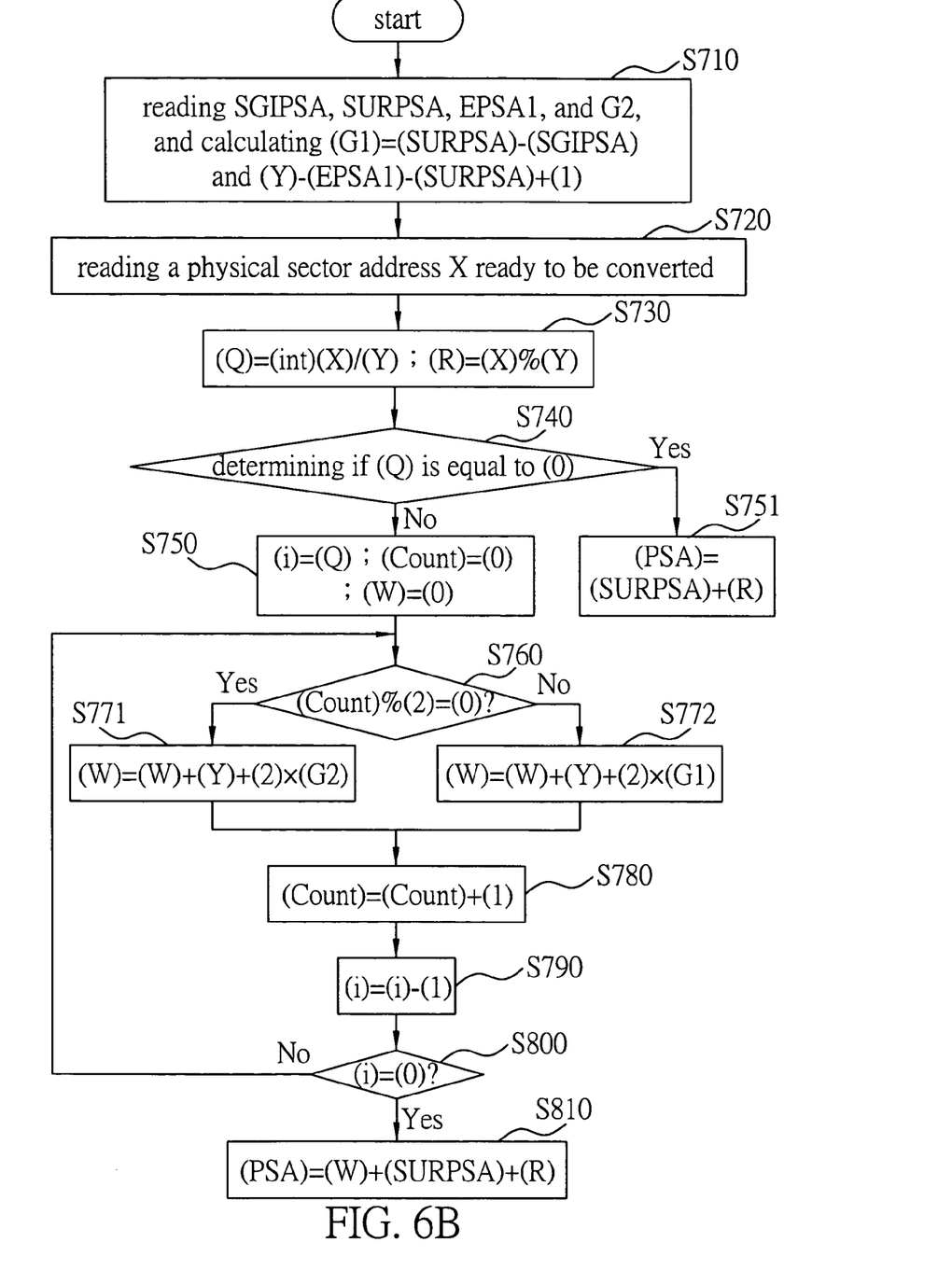
FIG. 6B is a flowchart illustrating how a logical sector address is converted to a physical sector address.

FIG. 6B is a schematic diagram of a process to convert a logical sector address to a physical sector address. The process begins in step S710, reading the beginning physical sector address (called SGIPSA in brief hereinafter) of the lead-in area 311 in the lead-in area 311, the beginning physical sector address (called SURPSA in brief hereinafter) of the first user region 312, the ending physical sector address (called EPSAL in brief hereinafter) of the first user region 312, and two numbers (called G2 in brief hereinafter) of the first jump region 313 and the outside jump region 331, and calculating three numbers (called G1 in brief hereinafter) of the physical sectors of the lead-in area 311, the inside jump region 333 and the second jump region 321, and two number (called Y in brief hereinafter) of physical sectors of the first user region 312 and the intermediate layer user region 332, wherein (G1)=(SURPSA)−(SGIPSA) and (Y)=(EPSA1)−(SURPSA)+(1). Then, flow proceeds to step S720.

In step S720, a logical sector address (called X in brief hereinafter) that needs to be converted is read. Then, flow proceeds to step S730.

In step S730, a quotient (called Q in brief hereinafter) and a remainder (called R in brief hereinafter) of (X)/(Y) are calculated. Then, flow proceeds to step S740.

In step S740, determine if (Q) is (0), and, if it is, proceed to step S751, or, if it is not, proceed to step S750.

In step S751, calculate the physical sector address (called PSA in brief hereinafter) according to the equation (PSA)=(SURPSA)+(R).

In step S750, initialize a parameter (called I in brief hereinafter)=(Q), a count number (called Count in brief hereinafter)=(0), and another parameter (called W in brief hereinafter)=(0). Then, flow proceeds to step S760.

In step S760, determine if Count is divisible by two, and if it is, proceed to step S771, or, if it is not, proceed to S772.

In step S771, calculate the equation (W)=(W)+(Y)+(2)×(G2). Then, flow proceeds to step S780.

In step S772, calculate the equation (W)=(W)+(Y)+(2)×(G1). Then, flow proceeds to step S780.

In step S780, calculate (Count)=(Count)+(1). Then, proceed to step S790.

In step S790, calculate (i)=(i)−(1). Then, proceed to step S800.

In step S800, determine if I is equal to zero, and, if it is, proceed to step S810, or, if it is not, return to step S760.

In step S810, calculate the physical sector address (called PSA in brief hereinafter) according to an equation (PSA)=(W)+(SURPSA)+(R).

The above conversion process that converts between a physical sector address and a logical sector address as shown in FIG. 6A and FIG. 6B is applicable to a multi-layered recording data structure (including any recording media having two, three, or more than three recording layers). However, as to the dual-layered recording media, which has a simple structure and comprises only one first jump region and one second jump region, the conversion method can be simplified.

Please refer to FIG. 3A and FIG. 6A. The method to convert a physical sector address to a logical sector address first reads the beginning physical sector address (SGIPSA) of the lead-in area 311, the beginning physical sector address (SURPSA) of the first user region 312, the ending physical sector address (EPSAL) of the first user region 312, and the numbers (G2) of physical sectors of the first jump region 313 and the second jump region 321. The number (Y) of the first user region 312 is derived from the equation (Y)=(EPSA1)−(SURPSA)+(1). The method then reads the physical sector address (X) that needs to be converted of the recording media. The method then calculates the difference (W) between X and SURPSA. Lastly, the method obtains the logical sector address by determining if W is smaller than Y. If it is, the logical sector address (LSA) is set to W, or, if it is not, the logical sector address (LSA) is calculated as (LSA)=(W)−(2)×(G2).

Please refer to FIG. 3A and FIG. 6B. The method to convert a logical sector address to a physical sector address first reads the beginning physical sector address (SGIPSA) of the lead-in area 311 in the lead-in area 311, the beginning physical sector address (SURPSA) of the first user region 312, the ending physical sector address (EPSA1) of the first user region 312, and the numbers (G2) of physical sectors of the first jump region 313 and the second jump region 321. The number (Y) of physical sectors of the first user region 312 can be derived according to the equation (Y)=(EPSA1)−(SURPSA)+(1). The method then reads a logical sector address (X) that needs to be converted. The method then calculates the quotient (Q) and the remainder (R) of (X)/(Y). Lastly, the method calculates the physical sector address (PSA) according to the equation (PSA)=(SURPSA)+(Q)×[(Y)+(2)×(G2)]+(R).

In summary, the recording media data structure and the method of reading data recorded in the recording media are applicable to any optical disk having at least two recording layers, and the physical sector addresses for connecting neighboring recording layers are continuous. Therefore, the present invention makes full use of the allocation address numbers. Further, the present invention presents an easy conversion method between a physical sector address and a logical sector address. Moreover, the present invention records the ending physical sector addresses of all of the recording layers in the lead-in area. Therefore, the optical driver can compare the current physical sector address and determine in what recording layer the optical pickup is currently tracking. The optical driver can further determine in what recording layer a physical sector address that needs to be read is located, so as to determine if the optical pickup needs to jump to another recording layer, and improve the reading efficiency of the recording media.

The above-described exemplary embodiments are illustrative and not restrictive, describing various objects and features of the present invention. A person of ordinary skill in the art can recognize that changes could be made in form and detail without departing from the sprit and the scope of the invention. Thus, the protective scope of the present invention falls within the appended claims.

What is claimed is:

1. A recording media data structure comprising:
   a first recording layer having a lead-in area, a first user region successive to a physical sector of the lead-in area and for storing user data, and a first jump region successive to a physical sector of the first user region; and
   a second recording layer stacked on the first recording layer, the second recording layer having a second jump region, a second user region successive to a physical sector of the second jump region and for storing user data, and a guide-out region successive to a physical sector of the second user region;
   wherein each of the lead-in area, the first jump region, the second jump region, and the guide-out region has a constant number of physical sectors, and the second jump region has a beginning physical sector address in sequence with an ending physical sector address of the first jump region.

2. The recording media data structure of claim 1, wherein the lead-in area is recorded with a beginning physical sector address (SGIPSA) of the lead-in area, a beginning physical sector address (SURPSA) of the first user region, and two numbers of physical sectors of the first jump region and the second jump region.

3. The recording media data structure of claim 2, wherein the lead-in area is further recorded with ending physical sector addresses (EPSA) of the first user region and the second user region.

4. The recording media data structure of claim 1, wherein both of the first recording layer and the second recording layer have progressively increasing physical sector addresses.

5. The recording media data structure of claim 1, wherein both of the first recording layer and the second recording layer have progressively decreasing physical sector addresses.

6. The recording media data structure of claim 1, wherein the lead-in area, the first jump region, the second jump region, and the guide-out region have an identical number of the physical sectors.

7. The recording media data structure of claim 1, wherein the recording media data structure is implemented in an optical disk.

8. A recording media data structure comprising:
  a first recording layer having a lead-in area, a first user region successive to a physical sector of the lead-in area and for storing user data, and a first jump region successive to a physical sector of the first user region;
  at least an intermediate layer stacked on the first recording layer, the intermediate recording layer having an outside jump region, a user region successive to a physical sector of the outside jump region and for storing user data, and an inside jump region successive to a physical sector of the user region; and
  a second recording layer stacked on the intermediate recording layer, the second recording layer having a second jump region, a second user region successive to a physical sector of the second jump region and for storing user data, and a guide-out region successive to a physical sector of the second user region;
  wherein the lead-in area and the first jump region of the first recording layer, the outside jump region and the inside jump region of the intermediate recording layer, and the second jump region and the guide-out region of the second recording layer have a constant number of physical sectors; the outside jump region has a beginning physical sector address in sequence with an ending physical sector address of the first jump region; and the second jump region has a beginning physical sector address in sequence with an ending physical sector address of the inside jump region.

9. The recording media data structure of claim 8, wherein the lead-in area is recorded with a beginning physical sector address (SGIPSA) of the lead-in area, a beginning physical sector address (SURPSA) of the first user region, and five numbers of physical sectors of the first jump region, the outside jump region, the inside jump region, the second jump region and the guide-out region.

10. The recording media data structure of claim 9, wherein the lead-in area is further recorded with ending physical sector addresses (EPSA) of the first user region, the intermediate user region, and the second user region.

11. The recording media data structure of claim 8, wherein the first recording layer, the intermediate recording layer, and the second recording layer have progressively increasing physical sector addresses.

12. The recording media data structure of claim 8, wherein the first recording layer, the intermediate recording layer, and the second recording layer have progressively decreasing physical sector addresses.

13. The recording media data structure of claim 8, wherein the lead-in area, the first jump region, the outside jump region, the inside jump region, the second jump region, and the guide-out region have identical numbers of the physical sectors.

14. The recording media data structure of claim 8, wherein the recording media data structure is implemented in an optical disk.

15. A method of reading data recorded in recording media, the method being applicable to a recording media having a first recording layer and a second recording layer stacked on the first recording layer, the first recording layer comprising a lead-in area, a first user region successive to a physical sector of the lead-in area and for storing user data, and a first jump region successive to a physical sector of the first user region, and the second recording layer comprising a second jump region, a second user region successive to a physical sector of the second jump region and for storing user data, and a guide-out region successive to a physical sector of the second jump region, the method comprising:
  (1) recording in the lead-in area a beginning physical sector address (SGIPSA) of the lead-in area, a beginning physical sector address (SURPSA) of the first user region, ending physical sector addresses (EPSA) of the first user region and the second user region, and three numbers of physical sectors of the first jump region, the second jump region, and the guide-out region;
  (2) reading an ending physical sector address of the first user region of the lead-in area, and the numbers of physical sectors of the first jump region and the second jump region;
  (3) reading a current physical sector address and determining if the read current physical sector address is located in the ending physical sector address, and, if it is, proceeding to step (4), otherwise repeating step (3); and
  (4) jumping to the second recording layer, interpreting the current physical sector address, and utilizing a predetermined conversion method to calculate and find the beginning physical address of the second user region of the second recording layer according to the ending physical sector address of the first user region, so as to be able to read user data successively.

16. The method of claim 15, wherein the method is implemented for an optical disk comprising at least two layers.

* * * * *